United States Patent [19]
Coletti

[11] Patent Number: 6,006,540
[45] Date of Patent: Dec. 28, 1999

[54] CHARGE AIR MANAGEMENT SYSTEM FOR AUTOMOTIVE ENGINE

[75] Inventor: Onorio Coletti, Harrison Township, Mich.

[73] Assignee: Ford Global Technologies, Inc., Dearborn, Mich.

[21] Appl. No.: 09/128,162

[22] Filed: Aug. 3, 1998

[51] Int. Cl.[6] .................................................. F25D 11/00
[52] U.S. Cl. ........................ 62/430; 62/323.1; 62/238.6; 60/599; 123/542; 123/563
[58] Field of Search .................... 123/542, 563; 60/599; 62/430, 323.1, 238.6

[56] References Cited

U.S. PATENT DOCUMENTS

| | | |
|---|---|---|
| 3,306,032 | 2/1967 | Chaffiotte . |
| 4,283,917 | 8/1981 | Proffer . |
| 4,683,725 | 8/1987 | Sugiura ...................................... 62/199 |
| 4,870,828 | 10/1989 | Hidaka . |
| 4,918,923 | 4/1990 | Woollenweber ........................... 60/597 |
| 5,036,668 | 8/1991 | Hardy ........................................ 60/599 |
| 5,172,753 | 12/1992 | Kadle et al. ............................... 165/42 |
| 5,269,143 | 12/1993 | Cikanek et al. . |
| 5,394,854 | 3/1995 | Edmaier et al. ......................... 123/563 |
| 5,415,147 | 5/1995 | Nagle et al. ............................. 123/563 |
| 5,435,289 | 7/1995 | Pendlebury . |
| 5,492,103 | 2/1996 | Goto ........................................ 123/564 |
| 5,598,705 | 2/1997 | Uzkan ....................................... 60/599 |
| 5,809,981 | 9/1998 | Berg-Sonne ............................. 123/563 |
| 5,910,099 | 6/1999 | Jordan, Jr. et al. ....................... 60/599 |

FOREIGN PATENT DOCUMENTS 60-93118   5/1985   Japan .

*Primary Examiner*—Henry Bennett
*Assistant Examiner*—Mark Shulman
*Attorney, Agent, or Firm*—Jerome R. Drouillard

[57] ABSTRACT

A charge air management system for an automotive engine includes a charge air-to-liquid coolant heat exchanger for receiving refrigerated liquid coolant from a reservoir. The liquid coolant is refrigerated by means of an engine driven refrigerant system including a compressor, a condenser, and an evaporator mounted within the reservoir.

17 Claims, 2 Drawing Sheets

CHARGE AIR MANAGEMENT SYSTEM FOR AUTOMOTIVE ENGINE

BACKGROUND OF THE INVENTION

1. Field of the Invention

The present invention relates to a system and method for providing an automotive engine with variable levels of charge air cooling, including an intense intermittent level which may be accompanied by an increase in intake manifold pressure provided by a booster device such as a turbo supercharger ("turbocharger") or other boost device such as a mechanically driven supercharger.

2. Disclosure Information

Engine designers seeking to obtain higher performance levels from automobile engines, particularly during intermittent operation, have devised increasingly complex solutions. Accordingly, systems are currently used for providing engines with nitrous oxide, and various schemes are used for supercharging or turbocharging engines. A drawback inherent with nitrous oxide arises from the fact that a nitrous bottle must be refilled frequently because the amount of nitrous capable of being carried with most systems is quite low as compared with the added weight associated with the nitrous system. Although supercharge and turbocharge air systems provide advantages, it would be desirable to nevertheless provide a much higher output from the engine intermittently, but without the need for either nitrous injection or overcharged boost equipment, and the present invention accomplishes this.

Japanese patent 93,118 discloses a system for refrigerating air entering an engine air inlet. The system of the '118 patent does, however, suffer from a shortcoming because the refrigeration plant is used only for the purpose of refrigerating the air found within a surge tank. Such a system is necessarily limited in its capability because only a small quantity of air may be accommodated, compared with the large quantity of air flowing through an engine at high speed and high load conditions.

A system and method according to the present invention overcomes the drawbacks of the '118 patent by providing a highly superior thermal reservoir in the form of a liquid coolant reservoir which is refrigerated by an on-board air conditioning compressor such that the liquid coolant is available to flood a charge air-to-cooling liquid heat exchanger to provide extra densification of charge air for brief periods of time. A system according to the present invention provides increased engine output without the need for an oversized supercharger or turbocharger and without the attendant drawbacks of nitrous oxide systems.

SUMMARY OF THE INVENTION

A charge air management system for an automotive engine includes a coolant reservoir containing a quantity of liquid coolant and a refrigeration system for removing heat from the liquid coolant within the reservoir. A charge air-to-liquid coolant heat exchanger receives refrigerated coolant from the reservoir and chills charge air entering the engine.

A refrigeration system according to the present invention preferably comprises a refrigerant compressor driven by the engine and a condenser for receiving high pressure refrigerant vapor from the compressor and for liquefying the refrigerant. An evaporator is housed within the coolant reservoir for the purpose of receiving liquid refrigerant from the condenser and for absorbing heat from the liquid coolant as the refrigerant changes phase from a liquid to a gaseous state.

According to another aspect of the present invention, a refrigeration system may further comprise an ambient air-to-liquid coolant heat exchanger for removing heat from the liquid coolant. Alternatively, the system may further comprise an ambient air-to-charge air heat exchanger for cooling the charge air before the charge air-to-liquid heat exchanger.

A system according to the present invention also preferably includes an engine driven booster such as a turbocharger or a supercharger for increasing the quantity of charge air entering the engine's air inlet. In such case, the charge air-to-liquid coolant heat exchanger will be positioned between the booster and the air inlet for receiving refrigerated coolant from the reservoir and for chilling charge air entering the air inlet.

A control system, which may comprise part of the engine's electronic control module, may be employed for controlling the recirculation of liquid coolant between only the ambient air-to-liquid coolant heat exchanger and the charge air-to-liquid coolant heat exchanger during engine operation at lower loads, while recirculating liquid coolant between only the coolant reservoir and the charge air-to-liquid coolant heat exchanger during engine operation at higher loads.

A control system incorporated as a part of the present invention will operate the booster, whether it be a turbocharger or supercharger, so that the quantity of charge air entering the engine is adjusted according to the temperature of the liquid coolant, with the quantity of charge air being increased in the event the temperature of the liquid coolant is less than a predetermined threshold. If desired, the refrigerant compressor comprising a portion of the present invention may be used for supplying airconditioning to the passenger cab of an automotive vehicle.

It is an advantage of the present invention that a system according to the present invention may be used to intermittently increase the output of an automotive engine without the need for nitrous oxide, without the need for higher blower overdrive ratios, and without the need for an oversized turbocharger, all of which increase the cost of an automotive engine.

DETAILED DESCRIPTION OF PREFERRED EMBODIMENTS

Figure 1:
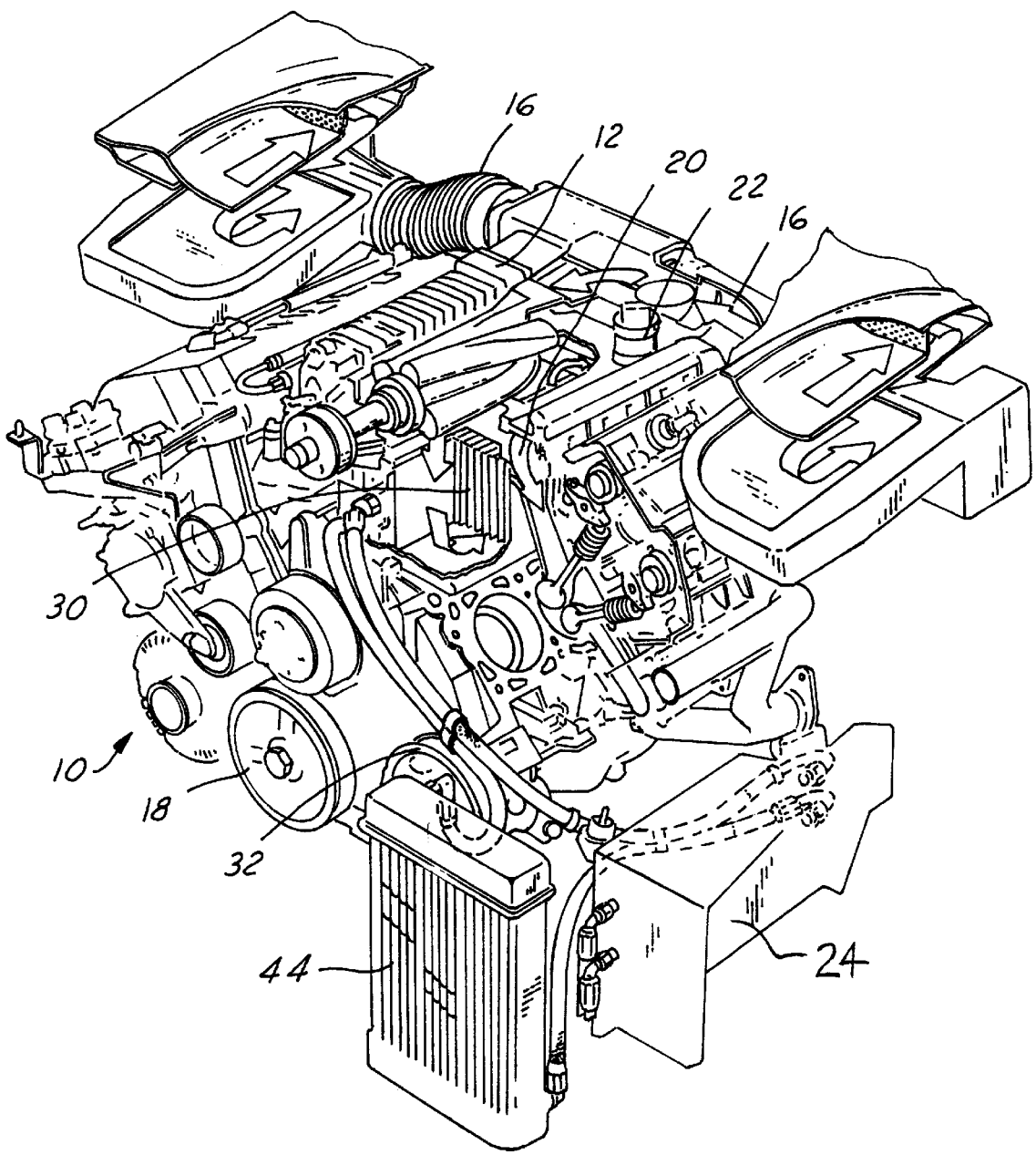
FIG. 1 is a schematic representation of a V-block engine having a charge air management system according to the present invention.

As shown in FIG. 1, engine 10 has supercharger 12, which is driven by a belt coupled to crankshaft 18. Charge air entering the engine's induction system through intake 16 flows through supercharger 12 and then ultimately through air inlet 20. Prior to flowing through air inlet 20, charge air moves through charge air-to-liquid coolant heat exchanger 30. Heat from the charge air, which is extracted by charge air-to-liquid coolant heat exchanger 30, is passed to the ambient atmosphere by means of ambient air-to-liquid coolant heat exchanger 44. However, during high load operation, refrigerated liquid coolant from coolant reservoir 24 is used to flood charge air-to-liquid coolant heat exchanger 30, with the result that the air charge entering the engine is more dense, with the further result that more fuel can be supplied to the engine for a much greater power output.

Figure 2:
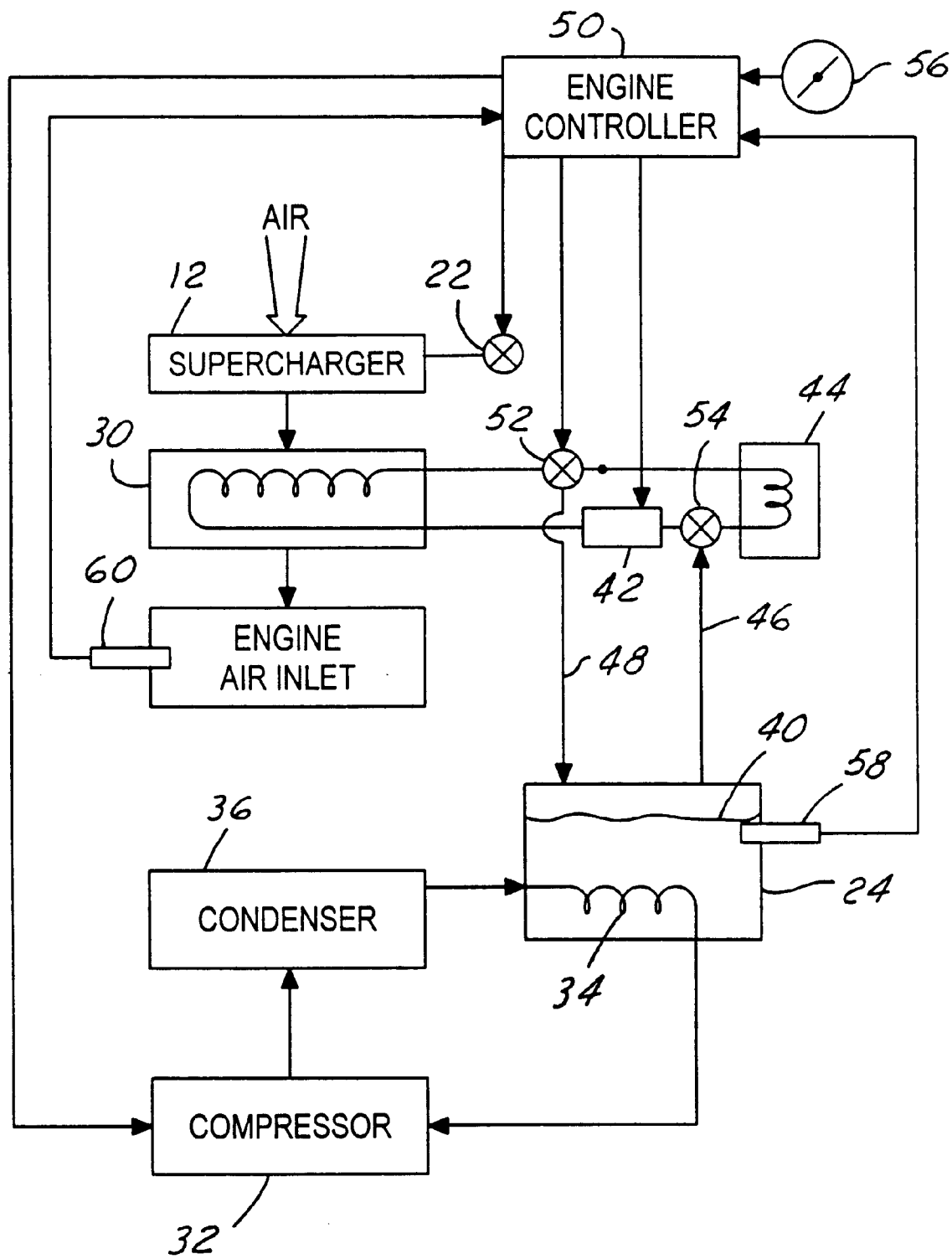
FIG. 2 is a schematic representation of a system including controls according to the present invention.

Continuing now with FIG. 2, engine controller 50 operates control valves 52 and 54 which have as their purpose controlling the flow of liquid coolant 40 such that liquid coolant 40 either recirculates between charge air-to-liquid coolant heat exchanger 30 and ambient air-to-liquid coolant heat exchanger 44 or between air-to-liquid coolant heat exchanger 30 and reservoir 24. Thus, when valves 52 and 54 are set so as to bypass heat exchanger 44, liquid coolant 40 is drawn from reservoir 24 and passes through line 46 through valve 54, then through circulating pump 42, and then into charge air-to-liquid coolant heat exchanger 30. After liquid coolant 40 has circulated through exchanger 30, valve 52 directs liquid coolant through line 48 to reservoir 24.

Heat is extracted from reservoir 24 by means of compressor 32 (see also FIG. 1), which supplies compressed refrigerant vapor to condenser 36, which in turn changes vapor to a liquid and sends it to evaporator 34. Of course, the refrigerant changes phase to a vapor in evaporator 34 thereby extracting heat from liquid coolant 40 within reservoir 24.

Engine controller 50 receives a signal from throttle position sensor 56. This signal is a measure of engine load. Those skilled in the art will appreciate, however, that other types of engine load detection devices could be used such as rpm detection, spark timing, and other sorts of devices. In any event, when liquid coolant 40 from reservoir 24 is circulating through heat exchanger 30, engine controller 50 may increase the boost provided by supercharger 12 by means of boost controller 22.

Engine controller 50 keeps track of the temperature of liquid coolant 40 within reservoir 24 by means of temperature sensor 58. Engine air inlet temperature is also monitored by means of temperature sensor 60. In the event that the engine air inlet temperature is too great or the temperature of liquid coolant 40 within reservoir 24 is too high, the boost will not be increased by means of boost control 22 and the liquid coolant will not be circulated from reservoir 24 to heat exchanger 30. Those skilled in the art will appreciate in view of this disclosure that controller 50 could comprise an engine controller unit of the type commonly employed with automotive engines, or alternatively, a stand-alone computer dedicated solely to operation of the present air charge handling system.

While the invention has been shown and described in its preferred embodiments, it will be clear to those skilled in the arts to which it pertains that many changes and modifications may be made thereto without departing from the scope of the invention.

What is claimed is:

1. A charge air management system for an automotive engine, comprising:

a coolant reservoir containing a quantity of liquid coolant;

a refrigeration system for removing heat from the liquid coolant within the reservoir; and a charge air-to-liquid coolant heat exchanger for receiving refrigerated coolant from the reservoir and for chilling charge air entering the engine.

2. A charge air management system according to claim 1, wherein said refrigeration system comprises:

a refrigerant compressor driven by the engine;

a condenser for receiving high pressure refrigerant vapor from the compressor and for liquefying the refrigerant; and an evaporator housed within the coolant reservoir, for receiving liquid refrigerant from the condenser, and for absorbing heat from the liquid coolant as the refrigerant returns to a gaseous state.

3. A charge air management system according to claim 2, wherein said refrigeration system further comprises an ambient air-to-liquid coolant heat exchanger for removing heat from the liquid coolant.

4. A charge air management system according to claim 1, further comprising an ambient air-to-charge air heat exchanger for cooling the charge air before the charge air-to-liquid heat exchanger.

5. A charge air management system for an automotive engine, comprising:

an engine driven booster for increasing the quantity of charge air entering the engine's air inlet;

a coolant reservoir containing a quantity of liquid coolant;

a refrigeration system for removing heat from the liquid coolant within the reservoir; and a charge air-to-liquid coolant heat exchanger, positioned between the booster and the air inlet, for receiving refrigerated coolant from the reservoir and for chilling charge air entering the air inlet.

6. A charge air management system according to claim 5, further comprising an ambient air-to-charge air heat exchanger for cooling the charge air before the charge air enters the charge air-to-liquid heat exchanger.

7. A charge air management system according to claim 5, wherein said engine driven booster comprises a turbocharger.

8. A charge air management system according to claim 5, wherein said engine driven booster comprises a supercharger.

9. A charge air management system according to claim 5, wherein said refrigeration system comprises:

a refrigerant compressor driven by the engine;

a condenser for receiving high pressure refrigerant vapor from the compressor and for liquefying the refrigerant; and an evaporator, housed within the coolant reservoir, for receiving liquid refrigerant from the condenser and for absorbing heat from the liquid coolant as the refrigerant returns to a gaseous state.

10. A charge air management system according to claim 9, wherein said refrigeration system further comprises an ambient air-to-liquid coolant heat exchanger for removing heat from the liquid coolant.

11. A charge air management system according to claim 10, further comprising a control system for recirculating liquid coolant between only the ambient air-to-liquid coolant heat exchanger and the charge air-to-liquid coolant heat exchanger during engine operation at lower loads, with said control system recirculating liquid coolant between only the coolant reservoir and the charge air-to-liquid coolant heat exchanger during engine operation at higher loads.

12. A charge air management system according to claim 8, wherein the control system operates the booster so that the quantity of charge air entering the engine is adjusted according to the temperature of the liquid coolant, with the quantity of charge air being increased in the event that the temperature of the liquid coolant is less than a predetermined threshold .

13. A charge air management system according to claim 9, wherein said refrigerant compressor comprises part of an air conditioning system for a passenger cab.

14. A charge air management system according to claim 9, further comprising a control system for operating the compressor such that condensed refrigerant will be furnished to the evaporator within the coolant reservoir only if the passenger cab is not being supplied with air conditioning.

15. A method for providing charge air to an automotive engine, comprising the steps of:

increasing the quantity of air entering the engine by means of an engine driven booster;

increasing the density of the charge air leaving the booster by passing the charge air over a charge air-to-cooling liquid heat exchanger positioned between a booster outlet and an air inlet for the engine;

providing the charge air-to-cooling liquid heat exchanger with a supply of cooling liquid maintained within a reservoir at a sub-ambient temperature; and refrigerating the cooling liquid within the reservoir by means of a refrigeration system powered by the engine.

16. A method according to claim 15, wherein cooling liquid is furnished to the charge air-to-cooling liquid heat exchanger when the engine is operated at higher loads.

17. A method according to claim 16, wherein the booster will be operated to provide a greater quantity of charge air whenever cooling liquid is furnished to the charge air-to-cooling liquid heat exchanger.

* * * * *